(12) United States Patent
Wang et al.

(10) Patent No.: US 11,219,863 B2
(45) Date of Patent: *Jan. 11, 2022

(54) METHOD FOR SEPARATION AND ENRICHMENT OF LITHIUM

(71) Applicant: QINGHAI INSTITUTE OF SALT LAKES, CHINESE ACADEMY OF SCIENCES, Xining (CN)

(72) Inventors: Min Wang, Xining (CN); Youjing Zhao, Xining (CN); Yan Li, Xining (CN); Huaiyou Wang, Xining (CN); Hongjun Yang, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/954,537

(22) PCT Filed: Mar. 19, 2019

(86) PCT No.: PCT/CN2019/078650
§ 371 (c)(1),
(2) Date: Jun. 17, 2020

(87) PCT Pub. No.: WO2020/073611
PCT Pub. Date: Apr. 16, 2020

(65) Prior Publication Data
US 2020/0306696 A1 Oct. 1, 2020

(30) Foreign Application Priority Data
Oct. 10, 2018 (CN) .......................... 201811179963.7

(51) Int. Cl.
*B01D 61/02* (2006.01)
*B01D 61/06* (2006.01)
(Continued)

(52) U.S. Cl.
CPC .......... *B01D 61/58* (2013.01); *B01D 61/022* (2013.01); *B01D 61/025* (2013.01);
(Continued)

(58) Field of Classification Search
CPC .... B01D 61/025; B01D 61/027; B01D 61/05; B01D 61/58; B01D 2311/04; C22B 26/12
See application file for complete search history.

(56) References Cited

U.S. PATENT DOCUMENTS

2012/0067808 A1* 3/2012 Tayalia ................. B64D 17/70
210/321.66
2012/0205313 A1* 8/2012 Sathrugnan ............... C02F 9/00
210/652
(Continued)

FOREIGN PATENT DOCUMENTS

CN 1542147 A 11/2004
CN 101979339 A 2/2011
(Continued)

OTHER PUBLICATIONS

Choi, Jae-Hwan, Sung-Hye Kim, and Seung-Hyeon Moon. "Heterogeneity of ion-exchange membranes: the effects of membrane heterogeneity on transport Properties." Journal of colloid and interface science 241.1 (2001): 120-126. (Year: 2001).*

(Continued)

*Primary Examiner* — Bradley R Spies
(74) *Attorney, Agent, or Firm* — Bayramoglu Law Offices LLC

(57) ABSTRACT

A method for separation and enrichment of lithium includes the following steps: pretreatment: carrying out at least two dilutions and at least two filtrations on salina aged brine to obtain pretreated brine; separation: separating the pretreated brine via a nanofiltration separation system to obtain nanofiltration permeate and nanofiltration concentrate; first con-
(Continued)

centration: carrying out first concentration on the nanofiltration permeate via a reverse osmosis system to obtain reverse osmosis concentrate and reverse osmosis permeate; second concentration: carrying out second concentration on the reverse osmosis concentrate via an electrodialysis system to obtain electrodialysis concentrate and electrodialysis permeate, and the electrodialysis concentrate is solution enriching lithium ions. The present application couples several different membrane separation technologies and dilutes the salina aged brine for many times, thereby realizing the purposes of improving separation efficiency of magnesium and lithium and improving the enrichment efficiency of lithium.

8 Claims, 1 Drawing Sheet

(51) Int. Cl.
    *B01D 61/42*     (2006.01)
    *B01D 61/58*     (2006.01)
    *C01D 15/00*     (2006.01)
    *C22B 26/12*     (2006.01)
    *B01D 61/04*     (2006.01)
    *B01D 61/14*     (2006.01)
    *B01J 47/12*     (2017.01)
    *C22B 3/42*     (2006.01)
(52) U.S. Cl.
    CPC .......... *B01D 61/027* (2013.01); *B01D 61/04* (2013.01); *B01D 61/06* (2013.01); *B01D 61/145* (2013.01); *B01D 61/422* (2013.01); *B01J 47/12* (2013.01); *C01D 15/00* (2013.01); *C22B 3/42* (2013.01); *C22B 26/12* (2013.01); *B01D 2311/04* (2013.01); *B01D 2311/25* (2013.01); *B01D 2311/2649* (2013.01); *B01D 2317/022* (2013.01); *B01D 2317/025* (2013.01)

(56) References Cited

U.S. PATENT DOCUMENTS

2014/0311980 A1*  10/2014  Weston ................... C02F 1/442
    210/652
2018/0332865 A1*  11/2018  Ding ...................... A22C 29/02

FOREIGN PATENT DOCUMENTS

| CN | 103074502 A | * | 5/2013 |
| CN | 106865582 A | | 6/2017 |
| CN | 107720785 A | | 2/2018 |
| CN | 108264066 A | | 7/2018 |
| CN | 108314064 A | | 7/2018 |
| CN | 109368670 A | | 2/2019 |

OTHER PUBLICATIONS

Mehner, Angela C. "Multimedia and Ultrafiltration for Reverse Osmosis Pretreatment Aboard Naval Vessels." Inquiry: The University of Arkansas Undergraduate Research Journal 11.1 (2010): 14. (Year: 2010).*
Wang Yan et al—CN 103074502 A Machine Translation—May 1, 2013 (Year: 2013).*
Chen Licheng et al—CN 108314064 A Machine Translation—Jul. 24, 2018 (Year: 2018).*
Zhong Yuan et al.—CN 106865582 A Machine Translation—Jul. 20, 2017 (Year: 2017).*

* cited by examiner

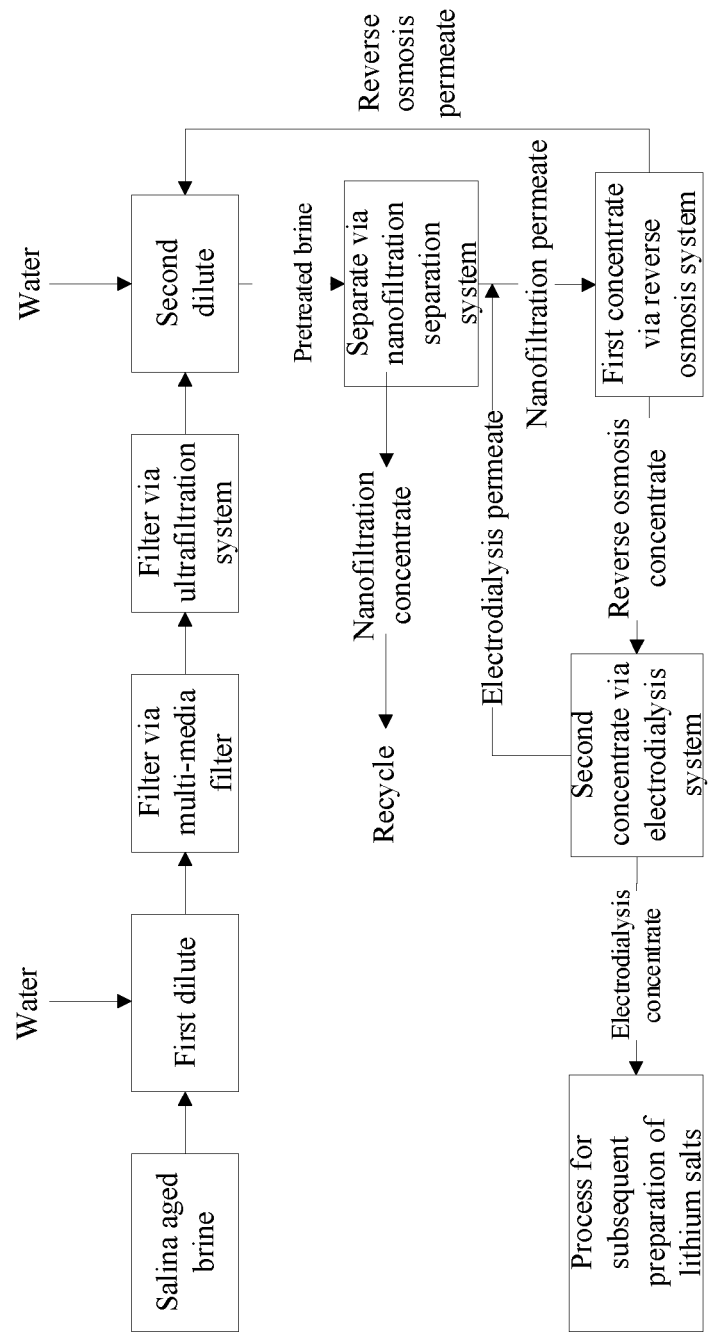

METHOD FOR SEPARATION AND ENRICHMENT OF LITHIUM

CROSS REFERENCE TO THE RELATED APPLICATIONS

This application is the national phase entry of International Application No. PCT/CN2019/078650, filed on Mar. 19, 2019, which is based upon and claims priority to Chinese Patent Application No. 201811179963.7, filed on Oct. 10, 2018, the entire contents of which are incorporated herein by reference.

TECHNICAL FIELD

The present application belongs to the technical field of solution separation and purification, and particularly to a method for separation and enrichment of lithium.

BACKGROUND

Lithium is an extremely important strategic resource. As the lightest metal element, lithium exists in forms of solid mineral and liquid mineral in nature. There are rich lithium resource reserves in China, industrial lithium resource reserves that have been explored rank second in the world, where brine lithium accounts for 79%, and future reserves of salt lake brine lithium in only Qinghai Tibet Plateau area is equivalent to total reserves that have been explored in other countries in the world. It is estimated that the reserves of lithium resources in Qinghai Salt Lake (calculated by lithium) are 1.5 million tons, ranking first in the country. Therefore, the technology for extracting lithium from salt lake brine has become the top priority in China's competition for energy strategic highland, and is a major strategic demand of the country. However, it is very difficult to extract lithium from salt lake brine according to composition features of salt lake brine. This is mainly because one significant feature of salt lake brine is high magnesium and low lithium (that is, the content of magnesium ions is much higher than that of lithium ions). The mass ratio of magnesium to lithium in the most salt lake brines is higher than 40. For example, the mass ratio of magnesium to lithium in Chaerhan salt lake is as high as 1800, and as high as 114 in Dachaidan Salt Lake, and the ratio of magnesium to lithium in Qinghai salt lake brine is also very high. Due to the similar chemical properties of magnesium and lithium, the presence of a large number of magnesium can lead to increased difficulty in separation and extraction of lithium. Therefore, it is necessary to develop new methods for separation and extraction of other important resources such as magnesium and lithium in salt lake brine.

The existing magnesium and lithium separation methods mainly include a precipitation method, an adsorption method, an extraction method and the like. In the process of separation, all the above methods have a certain limitation. For example, the precipitation method is suitable for brine in which the ratio of magnesium to lithium is low, and there are problems of excessively large consumption of a precipitating agent and high cost when the ratio of magnesium to lithium is high; the adsorption method has problems of low adsorption capacity of the adsorbent and high cost; the extraction method has high requirement on extraction agents, and problems, such as environment pollution and equipment corrosion, are easily generated in the process of extraction. In addition, although the above methods can reach enrichment of lithium to a certain extent in the process of reducing the mass ratio of magnesium to lithium of brine, the content of lithium ions in the finally obtained lithium-rich brine has not reached the concentration of preparing high-purity lithium salts, and thus it is required for further enrichment and concentration.

Except the above separation methods, there are also some studies on the separation of magnesium and lithium in salt lake brine by utilizing membrane separation technologies. For example, Chinese invention patent application No. 03108088.X introduces a method for separating magnesium and enriching lithium from salt lake brine by utilizing a nanofiltration method. Although the mass ratio of magnesium to lithium in salt lake brine is reduced by using this method to a certain extent, and the enrichment of lithium in brine is realized, the content of lithium ions in the finally obtained lithium-rich brine has not reached the lithium concentration required for the preparation of high-purity lithium salts, so it is necessary to continue the enrichment and concentration of lithium and the lithium ion yield in the separation process is low. Therefore, it is necessary to optimize the existing separation technology of magnesium and lithium in order to solve the problems of lithium ion enrichment efficiency, process cost and the like.

SUMMARY

In order to overcome the shortages of the prior art, this applicant has conducted intensive research and completed the application after a lot of creative work and in-depth experimental exploration, so as to complete the present application.

For achieving the foregoing objective of the disclosure, the technical solution adopted by the present application includes:

The present application provides a method for separation and enrichment of lithium, the method comprising:

pretreatment: carrying out at least two dilutions and at least two filtrations on salina aged brine to obtain pretreated brine;

separation: separating the pretreated brine via a nanofiltration separation system to obtain nanofiltration permeate and nanofiltration concentrate;

first concentration: carrying out first concentration on the nanofiltration permeate via a reverse osmosis system to obtain reverse osmosis concentrate and reverse osmosis permeate;

second concentration: carrying out second concentration on the reverse osmosis concentrate via an electrodialysis system to obtain electrodialysis concentrate and electrodialysis permeate, wherein the electrodialysis concentrate is solution enriching lithium ions.

Further, the pretreatment step is as follows: after being diluted for the first time, the salina aged brine is successively filtered in a multi-media filter and an ultrafiltration system and then diluted for the second time, so as to obtain the pretreated brine.

Further, in the pretreatment step, the concentration of lithium ions in the salina aged brine is 0.2 g/L~5.0 g/L, and the mass ratio of magnesium to lithium is (6~180):1; the first dilution multiple of the salina aged brine is 0.5~4.5 times, and the second dilution multiple is 3.5~20 times after filtration via the ultrafiltration system.

Preferably, in the pretreatment step, the concentration of lithium ions in the salina aged brine is 2.5 g/L~4.0 g/L, the mass ratio of magnesium to lithium is (6~55):1; the dilution multiple of the salina aged brine after two dilutions is 5~20 times.

More preferably, the dilution multiple of the salina aged brine after two dilutions is 14~16 times.

Further, in the separation step, the nanofiltration separation system adopts a monovalent ion selective nanofiltration membrane, the nanofiltration separation system comprises at least two stages of nanofiltration separation devices, and each stage of the nanofiltration separation device is formed by connecting multiple sections of nanofiltration separation units in series; the pretreated brine is subjected to separation of magnesium and lithium via multiple sections of the nanofiltration separation units of the first-stage nanofiltration separation device and then subjected to separation of magnesium and lithium via multiple sections of the nanofiltration separation units of the next-stage nanofiltration separation device; after multiple stages of nanofiltration separation, the nanofiltration permeate and the nanofiltration concentrate are obtained, wherein the nanofiltration concentrate is recycled by an energy recovery device.

Further, the nanofiltration separation system comprises two stages of nanofiltration separation devices, and each stage of nanofiltration separation device is formed by connecting three sections of nanofiltration separation units in series; in any one stage of the nanofiltration separation device, the quantity ratio of the nanofiltration membranes of three sections of the nanofiltration separation units is (35~85):(43~70):(25~55); the operation pressure of the nanofiltration separation system is 1.0 MPa~5.0 MPa, the concentration of lithium ions in the nanofiltration permeate is 0.2 g/L~2.0 g/L, and the mass ratio of magnesium to lithium in the nanofiltration permeate is (0.02~0.5):1.

Preferably, in any one stage of nanofiltration separation device, the quantity ratio of the nanofiltration membranes of three sections of the nanofiltration separation units is (55~65):(52~68):(35~45); the operation pressure of the nanofiltration separation system is 3.6 MPa~4.5 MPa, the concentration of lithium ions in the nanofiltration permeate is 0.5 g/L~1.2 g/L, and the mass ratio of magnesium to lithium in the nanofiltration permeate is (0.05~0.2):1.

Further, the reverse osmosis system is formed by connecting multiple sections of reverse osmosis units in series, the nanofiltration permeate is subjected to first concentration via various sections of reverse osmosis units in turn to obtain the reverse osmosis concentrate and the reverse osmosis permeate, and the reverse osmosis permeate is circulated back to the pretreatment step for diluting the salina aged brine.

Further, the reverse osmosis system is formed by connecting three sections of reverse osmosis units in series, the quantity ratio of reverse osmosis membranes of various sections of the reverse osmosis units is (22~62):(15~45):(5~43); the operation pressure in the first concentration step is 2.0 MPa~10.0 MPa, the concentration of lithium ions in the obtained reverse osmosis concentrate is 2.0 g/L~10 g/L, and the mass ratio of magnesium to lithium in the reverse osmosis concentrate is (0.05~3.0):1.

Preferably, the quantity ratio of reverse osmosis membranes of various sections of the reverse osmosis units is (38~46):(25~35):(20~28); the operation pressure in the first concentration step is 3.5 MPa~7.0 MPa, the concentration of lithium ions in the obtained reverse osmosis concentrate is 3.0 g/L~5.0 g/L, and the mass ratio of magnesium to lithium in the reverse osmosis concentrate is (0.07~0.2):1.

Further, in the electrodialysis step, the ion exchange membrane used in the electrodialysis system is one of a homogeneous membrane, a semi-homogeneous membrane and a non-homogeneous membrane; the electrodialysis permeate is circulated back to the first concentration step for concentrating lithium ions, the concentration of lithium ions in the electrodialysis concentrate is 8 g/L~21 g/L, and the mass ratio of magnesium to lithium in the electrodialysis concentrate is (0.05~1.0):1.

Preferably, in the electrodialysis step, the ion exchange membrane used in the electrodialysis system is the homogeneous membrane, and the cation exchange membrane is a CMX homogeneous membrane, and the anion exchange membrane is an AMX homogeneous membrane; the concentration of lithium ions in the electrodialysis concentrate is 14 g/L~18 g/L, and the mass ratio of magnesium to lithium in the electrodialysis concentrate is (0.07~0.2):1.

The present application has the following beneficial effects:

First of all, the present application couples several different membrane separation technologies by utilizing the advantages of different membrane separation technologies, so that the salina aged brine is successively treated by the ultrafiltration system, the nanofiltration system, the reverse osmosis system and the electrodialysis system, thereby realizing the separation of magnesium and lithium and enrichment of lithium. Specifically, all the mechanical impurities are filtered through the ultrafiltration system; sufficient separation of magnesium ions and lithium ions and improvement of the concentration of lithium ions are realized through the nanofiltration system. After nanofiltration, the mass ratio of magnesium to lithium in the nanofiltration permeate has been greatly reduced from (6~180):1 in the original salina aged brine to (0.02~0.5):1. It can be seen that the separation step of the present application effectively realizes the separation of magnesium and lithium; and lithium ions are concentrated through the reverse osmosis system to reduce the energy consumption of the whole process and improve the rationality of the whole process and system. Finally, the lithium-containing concentrate is further concentrated through the electrodialysis system so that the content of lithium ions is greatly increased from 0.2 g/L~5.0 g/L of the original salina aged brine to 8 g/L~21 g/L, thereby really realizing the enrichment of lithium ions, not only improving the enrichment efficiency but also ensuring the concentration of lithium ions after enrichment can meet the requirements of preparing high-purity lithium salts. To sum up, through the systematic research of the inventor of this patent, the coupling sequence of the above membrane separation systems is proposed, which can ensure that the process characteristics of different systems are fully utilized, realize the separation of magnesium and lithium in salt lake brine and efficient concentration and enrichment of lithium, and achieve the concentration of lithium ions required for the preparation of high-purity lithium salts.

Secondly, in the pretreatment step of the present application, the salina aged brine is diluted twice to improve the separation effect of magnesium and lithium. The inventor of the present application finds that, with improvement of dilution multiple, the water production of an NF membrane is gradually increased, the mass ratio of magnesium to lithium is gradually decreased, and the recovery rate of lithium is gradually improved, which indicates that dilution can improve the separation effect of magnesium and lithium in the process of nanofiltration. However, it is not that the higher the dilution multiple is, it the better is. Considering the recovery rate of Li, the mass ratio of magnesium to lithium in nanofiltration permeate, the cost of raw materials and the following process, the present application considers that the separation effect of magnesium and lithium in nanofiltration process is the best when the dilution multiple is 5-20 times, especially 14-16 times.

Thirdly, in the separation step of the present application, a multi-section and multi-stage nanofiltration separation method is adopted, and meanwhile an efficient nanofiltration membrane which can work under the ultrahigh pressure is also adopted. The pretreated brine is fed to the high pressure side of the nanofiltration separation system, and the sufficient separation of magnesium and lithium in the brine can be realized by utilizing a differential pressure between two sides of the nanofiltration membrane and difference of the nanofiltration membrane on selectivity of monovalent and divalent ions, accordingly, the mass ratio of magnesium to lithium in the brine can be effectively reduced, and it is beneficial to improving the concentration of lithium ions in the nanofiltration permeate. Moreover, through the nanofiltration separation device set in multiple stages, multi-stage nanofiltration can be carried out on the pretreated brine. After the multi-stage nanofiltration, the magnesium/lithium ratio of the salina aged brine can be greatly reduced, and the efficient separation of magnesium and lithium can be realized.

In addition, in the first concentration step, the method of the present application adopts the reverse osmosis system formed by connecting multiple sections of reverse osmosis units in series. Through multiple sections of reverse osmosis operation, the concentration of lithium ions is effectively increased in the reverse osmosis process. In particular, the present application also studies and defines the quantity ratio of various reverse osmosis membranes in multiple sections of reverse osmosis units, so as to more sufficiently reduce the permeability of lithium ions in reverse osmosis permeate.

Finally, the present application can recover and recycle the nanofiltration concentrate generated in the process of nanofiltration and the reverse osmosis permeate generated in the process of reverse osmosis, thereby efficiently reducing the energy consumption of the whole method, reducing the discharge of waste water and saving the process cost.

BRIEF DESCRIPTION OF THE DRAWING

FIGURE is a flow chart of a method for separation and enrichment according to example 1.

DETAILED DESCRIPTION OF THE EMBODIMENTS

The salina aged brine in embodiments of the present application is from sulfate type lakes in Qinghai Area. In the salina aged brine, the concentration of lithium ions is 2.5 g/L, and the mass ratio of magnesium to lithium is 50:1.

Example 1

This example provides a method for separation and enrichment of lithium. In combination with the procedure of this example shown in FIGURE, the method of this example comprises the following steps:

Pretreatment: the above salina aged brine was diluted for the first time, the salina aged brine after first dilution was filtered in the multi-media filter to remove mechanical impurities such as partial sediment, subsequently filtered in an organic ultrafiltration system to completely remove impurities, and then diluted for the second time, so as to obtain pretreated brine, wherein the dilution multiple after two dilutions was 15 times.

Separation: the pretreated brine was separated by the nanofiltration separation system to obtain nanofiltration permeate and nanofiltration concentrate, wherein the concentration of lithium ions in the nanofiltration permeate is 1.2 g/L, the concentration of magnesium ions was reduced to 0.06 g/L, and the mass ratio of magnesium to lithium was 0.05:1. Specifically, the nanofiltration separation system adopts the monovalent ion selective nanofiltration membrane. The nanofiltration separation system included two stages of nanofiltration separation devices, and each stage of the nanofiltration separation device was formed by connecting three sections of nanofiltration separation units in series. The pretreated brine was subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was recycled through the energy recovery device to reduce the discharge of waste water. In the nanofiltration separation device of this example, the quantity ratio of nanofiltration membranes of three sections of nanofiltration separation units was (55~65):(52~68):(35~45) in sequence, and the operation pressure of the nanofiltration separation system was 3.6 MPa~4.5 MPa. Separation of magnesium and lithium can be more effectively realized by using the quantity ratio of various nanofiltration membranes. Meanwhile, since the nanofiltration separation in this example was carried out under the condition of ultrahigh pressure of greater than 3.6 MPa, it is beneficial to further improving the separation effect of magnesium and lithium and improving the content of lithium ions in the nanofiltration permeate.

First concentration: the nano filtration permeate was subjected to first concentration via the reverse osmosis system to obtain reverse osmosis concentrate and reverse osmosis permeate, wherein the concentration of lithium ions in the reverse osmosis concentrate was 5 g/L, and the mass ratio of magnesium to lithium was 0.07:1. Specifically, the reverse osmosis system was formed by connecting three reverse osmosis units in series, each section of reverse osmosis unit respectively contained different quantities of reverse osmosis membranes, the nanofiltration permeate was subjected to first concentration via various reverse osmosis units in turn to obtain reverse osmosis concentrate and reverse osmosis permeate, the reverse osmosis permeate was circulated back to the pretreatment step for diluting salina aged brine so as to improve the utilization rate of the reverse osmosis permeate. In the reverse osmosis system of this example, the quantity ratio of reverse osmosis membranes of various sections of the reverse osmosis units was (38~46):(25~35):(20~28), and the operation pressure of the first concentration was 7.0 MPa. Through a manner of adopting the quantity ratio of multi-section different reverse osmosis membranes, the permeability of lithium in the reverse osmosis permeate can be sufficiently reduced, which is conductive to enrichment of lithium in the reverse osmosis concentrate.

Second concentration: a homogeneous membrane was used as an ion exchange membrane of an electrodialysis system, the reverse osmosis concentrate was subjected to second concentration via the electrodialysis system to obtain electrodialysis concentrate and electrodialysis permeate, wherein the concentration of lithium ions in the electrodialysis concentrate was 18 g/L, and the mass ratio of magnesium to lithium was 0.07:1. Accordingly, after two concentrations, the concentration of enriched lithium ions in this example had reached the concentration of lithium ions required for preparing high-purity lithium salts. In addition, the electrodialysis permeate was circulated back to the first concentration step for concentrating lithium ions. Specifically, the electrodialysis permeate was blended with the nanofiltration permeate obtained from the separation step, recovery of residual lithium and reuse of electrodialysis permeate were realized through the reverse osmosis system for first concentration.

Compositions of salina aged brine adopted in this example and solution in various separation and concentration stages are as shown in Table 1

TABLE 1

Compositions of salina aged brine and solution in various separation and concentration stages in example 1

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.06 | 1.2 | 0.05 |
| Reverse osmosis concentrate | 0.35 | 5.0 | 0.07 |
| Electrodialysis concentrate | 1.42 | 20 | 0.07 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions is more than 87% in the whole separation process of magnesium and lithium, and the yield of lithium ions is more than 95% in the whole process of concentrating lithium ions. It can be seen that, the method in this example can effectively improve the utilization rate of lithium ions in the whole process.

Example 2

This example provides a method for separation and enrichment of lithium, comprising the following steps:

Pretreatment: the above salina aged brine was diluted for the first time, the salina aged brine after first dilution was filtered in the multi-media filter to remove mechanical impurities such as partial sediment, subsequently filtered in an organic ultrafiltration system to completely remove impurities, and then diluted for the second time, so as to obtain pretreated brine, wherein the dilution multiple after two dilutions was 5 times.

Separation: the pretreated brine was separated by the nanofiltration separation system to obtain nanofiltration permeate and nanofiltration concentrate, wherein the concentration of lithium ions in the nanofiltration permeate wash is 0.2 g/L, the concentration of magnesium ions was reduced to 0.10 g/L, and the mass ratio of magnesium to lithium was 0.5:1. Specifically, the nanofiltration separation system adopts a monovalent ion selective nanofiltration membrane, the nanofiltration separation system included two stages of nanofiltration separation devices, and each stage of the nanofiltration separation device was formed by connecting three sections of nanofiltration separation units in series; the pretreated brine was subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was recycled by an energy recovery device to reduce the discharge of waste water. In the nanofiltration separation device of this example, the quantity ratio of nanofiltration membranes of three sections of nanofiltration separation units was (55~65):(52~68):(35~45), and the operation pressure of the nanofiltration separation system was 4.5 MPa. Separation of magnesium and lithium was more effectively realized by using the quantity ratio of various nanofiltration membranes. Meanwhile, since the nanofiltration separation in this example was carried out at the ultrahigh pressure of 4.5 MPa, it was beneficial to further improving the separation effect of magnesium and lithium and improving the content of lithium ions in the naofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 2.0 g/L, the mass ratio of magnesium to lithium was 0.5:1. Specifically, the reverse osmosis system was formed by connecting three reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, the reverse osmosis permeate was circulated back to the pretreatment step for diluting salina aged brine so as to improve the utilization rate of the reverse osmosis permeate. In the reverse osmosis system of this example, the quantity ratio of reverse osmosis membranes of various sections of the reverse osmosis units was (22~34):(15~22):(32~43), and the operation pressure of the first concentration was 7.0 MPa. Through a manner of adopting the quantity ratio of multi-section different reverse osmosis membranes, the permeability of lithium in reverse osmosis permeate was sufficiently reduced, which was conductive to enrichment of lithium in the reverse osmosis concentrate.

Second concentration: a homogeneous membrane was used as an ion exchange membrane of an electrodialysis system, the reverse osmosis concentrate was subjected to second concentration via the electrodialysis system to obtain electrodialysis concentrate and electrodialysis permeate, wherein the concentration of lithium ions in the electrodialysis concentrate was 10.0 g/L, and the mass ratio of magnesium to lithium was 0.52:1. Accordingly, after two concentrations, the concentration of enriched lithium ions in this example had reached the concentration of lithium ions required for preparing high-purity lithium salts. In addition, the electrodialysis permeate was circulated back to the first concentration step for concentrating lithium ions. Specifically, the electrodialysis permeate was blended with the nanofiltration permeate obtained from the separation step, recovery of residual lithium and reuse of electrodialysis permeate were realized through the reverse osmosis system for first concentration.

Compositions of salina aged brine adopted in this example and solution in various separation and concentration stages are as shown in Table 2

TABLE 2

Compositions of salina aged brine and solution in various
separation and concentration stages in example 2

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.10 | 0.20 | 0.5 |
| Reverse osmosis concentrate | 1.0 | 2.0 | 0.5 |
| Electrodialysis concentrate | 5.2 | 10.0 | 0.52 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions is more than 65% in the whole separation process of magnesium and lithium, and the yield of lithium ions is more than 65% in the whole process of concentrating lithium ions. It can be seen that, the method in this example can effectively improve the utilization rate of lithium ions in the whole process.

Example 3

This example provides a method for separation and enrichment of lithium, comprising the following steps:

Pretreatment: the above salina aged brine was diluted for the first time, the salina aged brine after first dilution was filtered in the multi-media filter to remove mechanical impurities such as partial sediment, subsequently filtered in an organic ultrafiltration system to completely remove impurities, and then diluted for the second time, so as to obtain pretreated brine, wherein the dilution multiple after two dilutions was 10 times.

Separation: the pretreated brine was separated by the nanofiltration separation system to obtain nanofiltration permeate and nanofiltration concentrate, wherein the concentration of lithium ions in the nanofiltration permeate was 0.36 g/L, the concentration of magnesium ions was reduced to 0.14 g/L, and the mass ratio of magnesium to lithium was 0.38:1. Specifically, the nanofiltration separation system adopts a monovalent ion selective nanofiltration membrane, the nanofiltration separation system included two stages of nanofiltration separation devices, and each stage of the nanofiltration separation device was formed by connecting three sections of nanofiltration separation units in series; the pretreated brine was subjected to separation of magnesium and lithium via three sections of nanofiltration separation units of the first-stage nanofiltration separation device and then subjected to further separation of magnesium and lithium via three sections of nanofiltration separation units of the second-stage nanofiltration separation device, so as to obtain the nanofiltration permeate and the nanofiltration concentrate after two stages of nanofiltration separation, wherein the nanofiltration concentrate was recycled by an energy recovery device to reduce the discharge of waste water. In the nanofiltration separation device of this example, the quantity ratio of nanofiltration membranes of three sections of nanofiltration separation units was (55~65):(52~68):(35~45), and the operation pressure of the nanofiltration separation system was 4.5 MPa. Separation of magnesium and lithium can be more effectively realized by using the quantity ratio of various nanofiltration membranes. Meanwhile, since the nanofiltration separation in this example was carried out at the ultrahigh pressure of 4.5 MPa, it was beneficial to further improving the separation effect of magnesium and lithium and improving the content of lithium ions in the nanofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 2.5 g/L, and the mass ratio of magnesium to lithium was 0.39:1. Specifically, the reverse osmosis system was formed by connecting three sections of reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, the reverse osmosis permeate was circulated back to the pretreatment step for diluting the salina aged brine so as to improve the utilization rate of the reverse osmosis permeate. In the reverse osmosis system of this example, the quantity ratio of reverse osmosis membranes of various sections of reverse osmosis units was (22~34):(15~22):(32~43), and the operation pressure of the first concentration was 7.0 MPa. Through a manner of adopting the quantity ratio of multi-section different reverse osmosis membranes, the permeability of lithium in reverse osmosis permeate can be sufficiently reduced, which was conductive to enrichment of lithium in the reverse osmosis concentrate.

Second concentration: a homogeneous membrane was used as an ion exchange membrane of an electrodialysis system, the reverse osmosis concentrate was subjected to second concentration via the electrodialysis system to obtain electrodialysis concentrate and electrodialysis permeate, wherein the concentration of lithium ions in the electrodialysis concentrate was 9.5 g/L, and the mass ratio of magnesium to lithium was 0.43:1. Accordingly, after two concentrations, the concentration of enriched lithium ions in this example had reached the concentration of lithium ions required for preparing high-purity lithium salts. In addition, the electrodialysis permeate was circulated back to the first concentration step for concentrating lithium ions. Specifically, the electrodialysis permeate was blended with the nanofiltration permeate obtained from the separation step, recovery of residual lithium and reuse of electrodialysis permeate were realized through the reverse osmosis system for first concentration.

Compositions of salina aged brine adopted in this example and solution in various separation and concentration stages are as shown in Table 3

TABLE 3

Compositions of salina aged brine and solution in various
separation and concentration stages in example 3

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.14 | 0.36 | 0.38 |
| Reverse osmosis concentrate | 0.97 | 2.5 | 0.39 |
| Electrodialysis concentrate | 4.58 | 12 | 0.38 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions was greater than 73% in the whole separation process of magnesium and lithium, the yield of lithium ions was greater than 79% in the whole separation process of magnesium and lithium. It can been seen that the method of the present application can effectively improve the utilization rate of lithium ions in the whole process.

Example 4

This example provides a method for separation and enrichment of lithium, comprising the following steps:

Pretreatment: the above salina aged brine was diluted for the first time, the salina aged brine after first dilution was filtered in the multi-media filter to remove mechanical impurities such as partial sediment, subsequently filtered in an organic ultrafiltration system to completely remove impurities, and then diluted for the second time, so as to obtain pretreated brine, wherein the dilution multiple after two dilutions was 20 times.

Separation: the pretreated brine was separated by the nanofiltration separation system to obtain nanofiltration permeate and nanofiltration concentrate, wherein the concentration of lithium ions in the nanofiltration permeate was 1.1 g/L, the concentration of magnesium ions was reduced to 0.06 g/L, and the mass ratio of magnesium to lithium was 0.05:1. Specifically, the nanofiltration separation system adopts a monovalent ion selective nanofiltration membrane, the nanofiltration separation system included two stages of nanofiltration separation devices, and each stage of the nanofiltration separation device was formed by connecting three sections of nanofiltration separation units in series; the pretreated brine was subjected to separation of magnesium and lithium via three sections of nanofiltration separation units of the first-stage nanofiltration separation device and then subjected to separation of magnesium and lithium via three sections of nanofiltration separation units of the second-stage nanofiltration separation device, so as to obtain nanofiltration permeate and nanofiltration concentrate after two stages of nanofiltration separation, wherein the nanofiltration concentrate was recycled by an energy recovery device to reduce the discharge of waste water. In the nanofiltration separation device of this example, the quantity ratio of nanofiltration membranes of three sections of nanofiltration separation units was (55~65):(52~68):(35~45), and the operation pressure of the nanofiltration separation system was 4.5 MPa. Separation of magnesium and lithium can be more effectively realized by using the quantity ratio of various nanofiltration membranes. Meanwhile, since the nanofiltration separation in this example was carried out at the ultrahigh pressure of 4.5 MPa, it was beneficial to further improving the separation effect of magnesium and lithium and improving the content of lithium ions in the nanofiltration permeate.

First concentration: the nanofiltration permeate was subjected to first concentration via the reverse osmosis system to obtain reverse osmosis concentrate and reverse osmosis permeate, wherein the concentration of lithium ions in the reverse osmosis concentrate was 4.7 g/L, and the mass ratio of magnesium to lithium was 0.08:1. Specifically, the reverse osmosis system was formed by connecting three sections of reverse osmosis units in series, each section of reverse osmosis unit respectively contained different quantities of reverse osmosis membranes, the nanofiltration permeate was subjected to first concentration via various sections of reverse osmosis units in turn to obtain reverse osmosis concentrate and reverse osmosis permeate, the reverse osmosis permeate was circulated back to the pretreatment step for diluting the salina aged brine so as to improve the utilization rate of the reverse osmosis permeate. In the reverse osmosis system of this example, the quantity ratio of reverse osmosis membranes of various sections of reverse osmosis units was (22~34):(15~22):(32~43), and the operation pressure of the first concentration was 7.0 MPa. Through a manner of adopting the quantity ratio of multi-section different reverse osmosis membranes, the permeability of lithium in the reverse osmosis permeate can be sufficiently reduced, which was conductive to enrichment of lithium in the reverse osmosis concentrate.

Second concentration: a homogeneous membrane was used as an ion exchange membrane of an electrodialysis system, and the reverse osmosis concentrate was subjected to second concentration via the electrodialysis system to obtain electrodialysis concentrate and electrodialysis permeate, wherein the concentration of lithium ions in the electrodialysis concentrate was 17 g/L, and the mass ratio of magnesium to lithium was 0.06:1. Accordingly, after two concentrations, the concentration of enriched lithium ions in this example had reached the concentration of lithium ions required for preparing high-purity lithium salts. In addition, the electrodialysis permeate was circulated back to the step of first concentration for concentration of lithium ions. Specifically, the electrodialysis permeate was blended with the nanofiltration permeate obtained from the separation step, recovery of residual lithium and reuse of electrodialysis permeate were realized through the reverse osmosis system for first concentration.

Compositions of salina aged brine adopted in this example and solution in various separation and concentration stages are as shown in Table 4

TABLE 4

Compositions of salina aged brine and solution in various separation and concentration stages in example 3

| Stage | Ion concentration (g/L) | | Mass ratio of magnesium to lithium |
|---|---|---|---|
| | $Mg^{2+}$ | $Li^+$ | |
| Salina aged brine | 125 | 2.5 | 50 |
| Nanofiltration permeate | 0.06 | 1.1 | 0.05 |
| Reverse osmosis concentrate | 0.38 | 4.7 | 0.08 |
| Electrodialysis concentrate | 1.02 | 17 | 0.06 |

The method in this example realizes the separation of magnesium and lithium and efficient enrichment of lithium in sulfate salt lake brine. The finally obtained electrodialysis concentrate (i.e., second concentrate) can be directly used for preparing high-purity lithium salts due to its high lithium ion concentration. The yield of lithium ions was greater than 88% in the whole separation process of magnesium and lithium, the yield of lithium ions was greater than 95.6% in the whole separation process of magnesium and lithium. It can been seen that the method of The present application can effectively improve the utilization rate of lithium ions in the whole process.

It should be understood that the above embodiments are only for illustrating the present application but not intended to limit the scope of protection of the present application. At the same time, it should be understood that after reading the technical content of the present application, those skilled in the art can make appropriate changes to the conditions and steps in the technical solution of the disclosure without departing from the principle of the present application, so as to realize the final technical solution. All these equivalents fall within the scope of protection defined in the appended claims of the present application.

What is claimed is:

1. A method for a separation and enrichment of lithium, comprising:
   a pretreatment step: performing at least two dilutions and at least two filtrations on a salina aged brine to obtain a pretreated brine;
   a separation step: separating the pretreated brine via a nanofiltration separation system to obtain a nanofiltration permeate and a nanofiltration concentrate;
   a first concentration step: performing a first concentration on the nanofiltration permeate via a reverse osmosis system to obtain a reverse osmosis concentrate and a reverse osmosis permeate; and
   a second concentration step: performing a second concentration on the reverse osmosis concentrate via an electrodialysis system to obtain an electrodialysis concentrate and an electrodialysis permeate, wherein the electrodialysis concentrate is a solution enriching lithium ions;
   wherein the reverse osmosis system is formed by connecting a plurality of sections of reverse osmosis units in series, the nanofiltration permeate is subjected to the first concentration via the plurality of sections of the reverse osmosis units in sequence to obtain the reverse osmosis concentrate and the reverse osmosis permeate, and the reverse osmosis permeate is circulated back to the pretreatment step for diluting the salina aged brine;
   wherein the reverse osmosis system is formed by connecting three sections of reverse osmosis units in series, and a quantity ratio of reverse osmosis membranes of the three sections of the reverse osmosis units is (22-62):(15-45):(5-43); an operation pressure in the first concentration step is 2.0 MPa-10.0 MPa, a concentration of lithium ions in the reverse osmosis concentrate is 2.0 g/L-10 g/L, and a mass ratio of magnesium to lithium in the reverse osmosis concentrate is (0.05-3.0):1.

2. The method according to claim 1, wherein the pretreatment step comprises: after the salina aged brine is subjected to a first dilution of the at least two dilutions, filtering the salina aged brine successively in a multi-media filter and an ultrafiltration system, and performing a second dilution of the at least two dilutions on the salina aged brine to obtain the pretreated brine.

3. The method according to claim 2, wherein in a salina aged brine before the pretreatment step, a concentration of lithium ions in the salina aged brine is 0.2 g/L-5.0 g/L, the mass ratio of magnesium to lithium is (6-180):1; and in the pretreatment step, a dilution multiple of the first dilution of the salina aged brine is 0.5-4.5 times, and a dilution multiple of the second dilution of the salina aged brine is 3.5-20 times after the salina aged brine is filtered via the ultrafiltration system.

4. The method according to claim 3, wherein in the salina aged brine before the pretreatment step, the concentration of the lithium ions in the salina aged brine is 2.5 g/L-4.0 g/L, and the mass ratio of magnesium to lithium is (6-55):1; and in the pretreatment step, the dilution multiple of the salina aged brine after being subjected to the first dilution and the second dilution is 5-20 times.

5. The method according to claim 1, wherein in the separation step, the nanofiltration separation system adopts a monovalent ion selective nanofiltration membrane, the nanofiltration separation system comprises at least two stages of nanofiltration separation devices, and each stage of the at least two stages of the nanofiltration separation devices is formed by connecting a plurality of sections of nanofiltration separation units in series; the pretreated brine is subjected to a first separation of magnesium and lithium via the plurality of sections of the nanofiltration separation units of a first-stage nanofiltration separation device of the at least two stages of the nanofiltration separation devices and subjected to a second separation of magnesium and lithium via the plurality of sections of the nanofiltration separation units of a second-stage nanofiltration separation device of the at least two stages of the nanofiltration separation devices to obtain the nanofiltration permeate and the nanofiltration concentrate, wherein the nanofiltration concentrate is recycled by an energy recovery device.

6. The method according to claim 5, wherein the nanofiltration separation system comprises two stages of nanofiltration separation devices, and each stage of the two stages of the nanofiltration separation devices is formed by connecting three sections of nanofiltration separation units in series; a quantity ratio of nanofiltration membranes of the three sections of the nanofiltration separation units in each stage of the two stages of the nanofiltration separation devices is (35-85):(43-70):(25-55); an operation pressure of the nanofiltration separation system is 1.0 MPa-5.0 MPa, a concentration of lithium ions in the nanofiltration permeate is 0.2 g/L-2.0 g/L, and a mass ratio of magnesium to lithium in the nanofiltration permeate is (0.02-0.5):1.

7. The method according to claim 1, wherein in the electrodialysis step, an ion exchange membrane used in the electrodialysis system is one selected from the group consisting of a homogeneous membrane, a semi-homogeneous membrane and a non-homogeneous membrane; the electrodialysis permeate is circulated back to the first concentration step for concentrating lithium ions, and a mass ratio of magnesium to lithium in the electrodialysis concentrate is (0.05-1.0):1.

8. The method according to claim 7, wherein in the electrodialysis step, the ion exchange membrane used in the electrodialysis system is the homogeneous membrane, and a cation exchange membrane is a CMX homogeneous membrane, and an anion exchange membrane is an AMX homogeneous membrane; a concentration of the lithium ions in the electrodialysis concentrate is 14 g/L-21 g/L, and the mass ratio of magnesium to lithium in the electrodialysis concentrate is (0.07-0.2):1.

* * * * *